Figure 6:
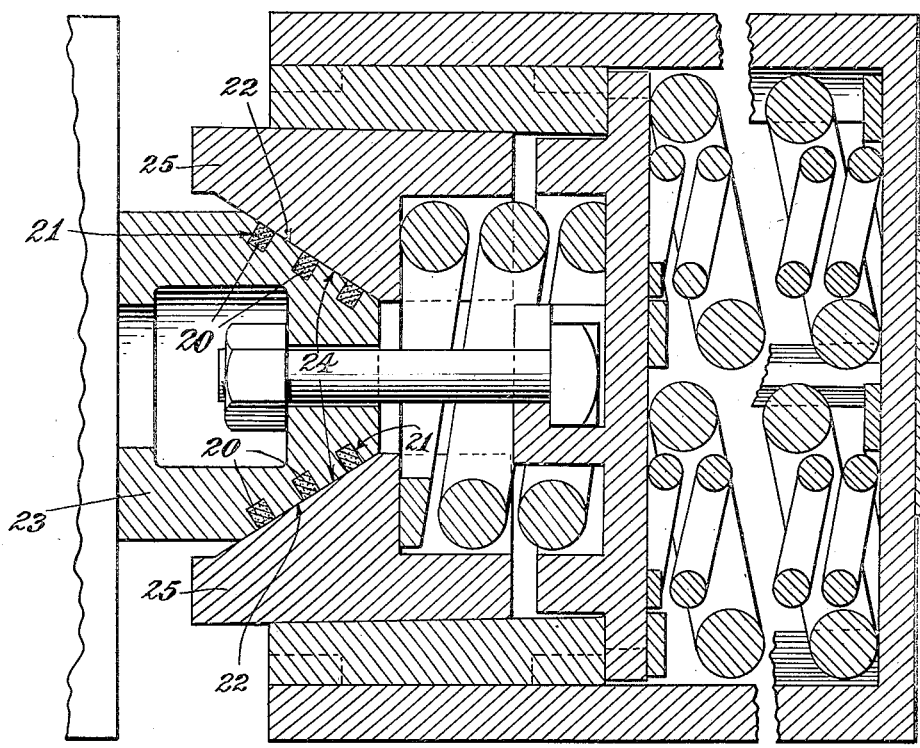

June 20, 1933.   C. K. BROOKS   1,914,479
SHOCK ABSORBING MECHANISM
Filed Sept. 16, 1927   2 Sheets-Sheet 1
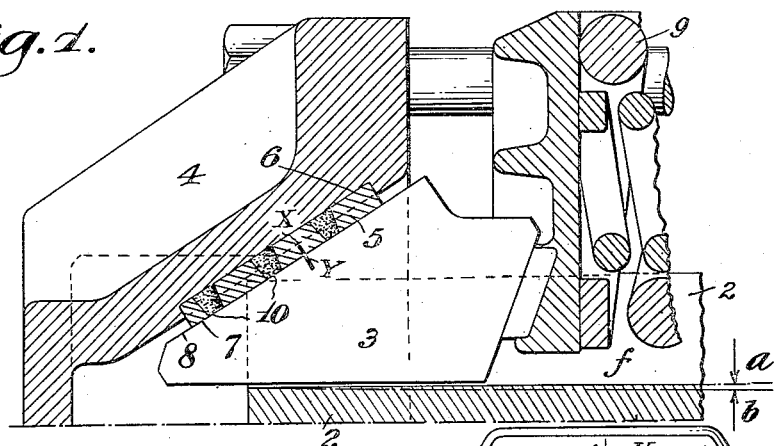
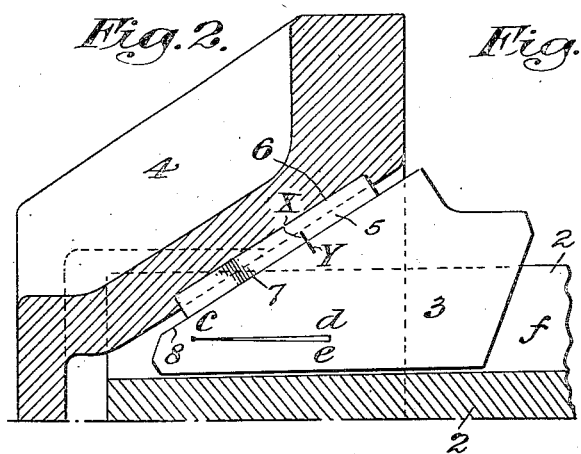
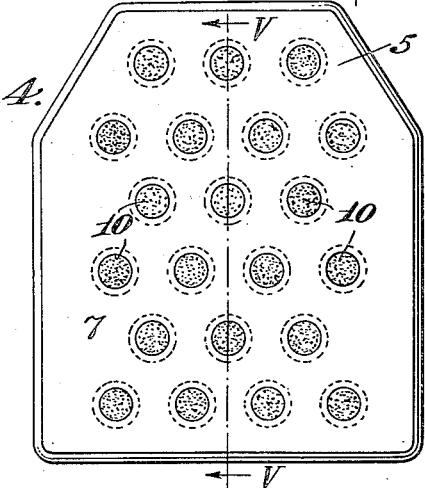
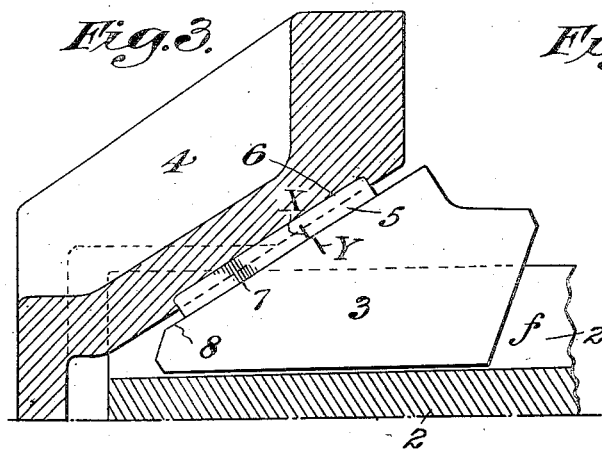
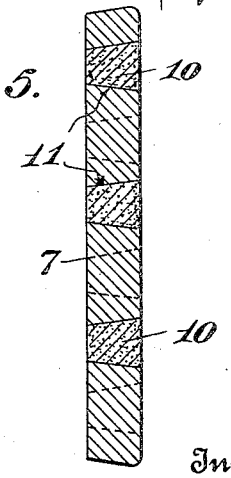
Inventor:
Chester K. Brooks
By his Attorney
Clarence D. Kerr June 20, 1933.  C. K. BROOKS  1,914,479
SHOCK ABSORBING MECHANISM
Filed Sept. 16, 1927  2 Sheets-Sheet 2

Inventor:
Chester K. Brooks
By his Attorney
Clarence E. Kerr

Patented June 20, 1933

1,914,479

UNITED STATES PATENT OFFICE

CHESTER K. BROOKS, OF KIRTLAND HILLS, OHIO, ASSIGNOR TO NATIONAL MALLEABLE AND STEEL CASTINGS COMPANY, OF CLEVELAND, OHIO, A CORPORATION OF OHIO

SHOCK ABSORBING MECHANISM

Application filed September 16, 1927. Serial No. 219,867.

My invention relates to shock absorbing mechanism, and particularly to shock absorbing mechanism adapted for use on railway cars in which friction shoes engage a friction member having a tapered friction face and are pressed thereagainst by a wedge member, which under compression forces the shoes to move longitudinally of the tapered friction member. The principal object of my invention is to use an anti-friction material between the wedge and friction shoes or segments for the purpose of preventing the wedge and shoes from sticking together under release, and the parts from creeping under continued draft. My invention also comprises various features which I shall hereinafter describe and claim.

In the accompanying drawings, Fig. 1 is a partial longitudinal section showing the application of my improvements to a shock absorbing mechanism of the included friction member type, with the parts in fully released position; Fig. 2 is a section similar to Fig. 1, but with the gear partially compressed; Fig. 3 is a section similar to Figs. 1 and 2, but illustrating the first phase of the release action; Fig. 4 is an enlarged plan of the face of one of the pads which engages the friction shoe; Fig. 5 is a section on lines V—V of Fig. 4; and Fig. 6 is a section of a gear embodying a modified form of my invention.

Referring more specifically to the drawings, in which I have shown my invention applied to a shock absorbing mechanism of the included friction type (although, obviously, my invention is applicable to any type of gear in which a wedge is used to force a friction shoe or segment against another friction member), 2 indicates the central friction member, having friction shoes or members 3 held against the friction faces $f$ of the central friction member by the wedge or follower 4. The face of the follower which engages the shoe may be provided with a soft metal insert or pad 5, preferably made of brass or similar metal, which may be attached to either wedge or shoe, but which I have shown seated in a recess 6 of the wedge, the face 7 of which bears on the wedging face 8 of a friction shoe.

The central friction member is slightly tapered, the amount of taper being indicated by the divergence of the lines $a$ and $b$ in Fig. 1, $a$ being the inward extension of one of the friction faces $f$ of the central member and $b$ a line parallel with the longitudinal central axis of such member. It will thus be seen that as the gear is compressed the shoes 3 will move along the friction surfaces $f$ and that the shoes (only one side of the gear being here shown) will move away from one another in an amount equal to the taper on the central member indicated in Fig. 1 by the divergence between the lines $a$—$b$, and the wedging angle at which the pad 5 engages the wedging face 7 of the shoe is such that with the gear developing normal friction capacity the follower wedge is stretched by the relatively slight outward movement of the shoes away from the axis of the gear. Thus, as is shown in Fig. 2, in which the gear is partially compressed, the shoe is moved the distance $c$—$d$ and in this distance the taper on the central member amounts to the short line $d$—$e$. The expansive quality of the wedge is such that, although the shoes have moved outwardly, the relative position of the pad 5 upon the engaging surface of the shoe is unchanged, because the wedge has been stretched to an amount equal to the outward movement of the shoes, and hence the lines X and Y indicated, which have been made to coincide in the released position of the gear in Fig. 1, will still coincide in the position shown in Fig. 2. If, however, a larger amount of taper is used, or if the resistance of the wedge to expanding is too great, the shoe will move a little ahead of the wedge, with the result that the line Y will move a little to the right of X. Or, if the taper on the central friction member is decreased, or the wedge made more resilient, then the shoe will move into the wedge.

In the first phase of the release action illustrated in Fig. 3, as the load upon the gear diminshes, the wedging grip between the wedge pad 5 and the shoe 3 is broken, and the wedge springs back to its normal shape before the friction shoes 3 move relative to the central member. The result is that the pad 5 has moved forwardly relative to the face of the shoe which it engages, which is indicated by the line X, which has moved to the left relative to Y. The compression spring 9 of the gear is then free to move the friction shoes 3 and with them the wedge 4 back to normal released position. During this return movement the shoes move back along the tapered central member and toward one another by the amount of the taper. As this distance between the shoes decreases, the shoes move back into the wedge until when the gear is fully released the lines X and Y again coincide, just as is shown in Fig. 1. I have found, however, that where the coefficient of friction between the wedge pads 5 and the shoes 3 is too great, either because of the material of which the parts are made or because of the accumulation of dirt between the wedging surfaces, the wedge does not release itself and spring back to the position shown in Fig. 3, but remains gripping the shoes, and as a result the gear has failed to release. I have obviated this difficulty by providing a permanent lubricant 10 for the engaging surfaces 7 and 8 of the pad 5 and shoes 3, which preferably is in the form of a graphite mixture carried in apertures or holes 11 in the face of the pad 5. These holes 11 preferably have a flaring taper away from the face 7 of the pad 5, so that the anti-friction material 10 may be forced into the holes 11 from the back side of the pad and after the pad is pressed into the depression 6 in the follower wedge the material will be held in these holes 11.

If desired, the wedge may be directly in contact with the friction segments without the interposition of separately formed pads between the wedge and segments. I have shown such a structure in Fig. 6, in which the lubricant or graphite mixture 20 is carried in apertures 21 located directly in the face 22 of the wedge follower 23, which engages the wedging faces 24 of the friction shoes 25.

I have found that graphite with a suitable binder forms a durable lubricant and gives extremely satisfactory results, but other antifriction materials and compositions may be used with good results.

It is to be understood that, while it is desirable to have a large proportion of the surface 7 of the wedge pad composed of antifriction material, it is not my intention to use a frictionless wedge, as this would result in seriously affecting the utility of the gear by rendering its performance very erratic. What I accomplish by my invention is to reduce the coefficient of friction between the wedge and shoes to such an extent that it eliminates sticking between these faces 7 and 8 and ensures the breaking of the elastic grip of the wedge upon the shoes, thereby providing a positive release of the wedge from the shoes at the beginning of the releasing operation.

Observation of gears not equipped with my invention has also shown that where the gears are under continued pull, particularly on roads having frequent curves, there is a tendency of the parts to creep, whereas with gears in which the engaging faces of the wedge and shoes are equipped with the permanent lubricant described above the performance of the gear is stiffened up, compression is maintained, and the parts are prevented from creeping.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. Frictional shock absorbing mechanism comprising a friction element; friction members in frictional engagement with said element; a wedge member; a soft metal member interposed between a friction member and wedge member and secured to one of said members and engaging the other member, said soft metal member being provided on its engaging face with a permanent partial lubricant whereby in release the breaking of the grip of the wedge on the friction member is ensured.

2. Frictional shock absorbing mechanism comprising a friction element; friction members in frictional engagement with said element; a wedge member; a soft metal member interposed between a friction member and wedge member and secured to one of said members and engaging the other member, said soft metal member being provided on its engaging face with a plurality of recesses containing a durable lubricant whereby in release the breaking of the grip on the friction member is ensured.

3. Frictional shock absorbing mechanism comprising a friction element; friction members in frictional engagement with said element; a wedge member; a soft metal member interposed between a friction member and wedge member and secured to one of said members and engaging the other member, said soft metal member being provided on its engaging face with a plurality of recesses containing graphite whereby in release the breaking of the grip on the friction member is ensured.

4. Frictional shock absorbing mechanism comprising a friction element; friction members in frictional engagement with said element; a wedge member, said wedge member having an elastic frictional grip upon said friction members when under compression; and non-metallic means for lubricating the engaging surfaces of the wedge and friction members to ensure the breaking of the grip of the wedge upon the friction members.

5. In friction shock absorbing mechanism, a wedge member; a friction member and friction shoes interposed between said members and adapted to be forced into frictional contact with said friction member by said wedge member, at least one of said members being slightly resilient whereby a slight relative movement between said wedge and shoe members is produced during the release of said mechanism; and non-metallic lubricating material contained in the wedging face of one of said last named members.

6. In friction shock absorbing mechanism, a wedge member; a friction member engaged by the wedge member, the engaging portion of one of the said members having non-metallic lubricating material contained therein to prevent sticking of such members during release and to provide a positive release of the wedge from the friction member, said lubricating material being seated in recesses in the said engaging portion.

7. In friction shock absorbing mechanism, a wedge member; a friction member engaged by the wedge member; a durable lubricant interposed between the engaging surfaces of the said members to prevent sticking of such members during release and to provide a positive release of the wedge from the friction member.

CHESTER K. BROOKS.